United States Patent [19]

Liang

[11] Patent Number: 5,056,307

[45] Date of Patent: Oct. 15, 1991

[54] EXHAUST NOZZLE COOLING UTILIZING TOTAL ENGINE FLOW

[75] Inventor: George Liang, Palm City, Fla.

[73] Assignee: The United States of America as represented by the Secretary of the Air Force, Washington, D.C.

[21] Appl. No.: 529,070

[22] Filed: May 25, 1990

[51] Int. Cl.⁵ ............................ F02K 3/02; F02K 1/38
[52] U.S. Cl. ..................................... 60/226.1; 60/262; 60/39.5
[58] Field of Search ............... 60/262, 266, 39.5, 271, 60/269, 226.1

[56] References Cited

U.S. PATENT DOCUMENTS 2,604,277  7/1952  Anxionnaz et al. ................. 60/266

Primary Examiner—Louis J. Casaregola
Assistant Examiner—Laleh Jalali
Attorney, Agent, or Firm—Irwin P. Garfinkle; Donald J. Singer

[57] ABSTRACT

This disclosure describes an arrangement for cooling the exhaust nozzle of a gas turbine engine by selectively diverting the unheated total engine air flow directly to the exhaust nozzle of the engine. After the total air flow impinges on the back surface of the exhaust nozzle to rapidly cool the nozzle, the air is redirected back to the fan and the core engine for supporting combustion and to provide cooling in a generally conventional manner.

8 Claims, 3 Drawing Sheets

EXHAUST NOZZLE COOLING UTILIZING TOTAL ENGINE FLOW

STATEMENT OF GOVERNMENT INTEREST

The invention described herein may be manufactured and used by or for the Government for governmental purposes without the payment of any royalty thereon.

BACKGROUND OF THE INVENTION

This invention relates to a system for rapidly cooling very hot exhaust nozzle surfaces of gas turbine engines, and is particularly useful in connection with gas turbine engines where very rapid cooling may be desirable or essential.

Traditionally, engine bypass air is the primary source for cooling of the exhaust nozzle of gas turbine engines and there are many patents showing various arrangements for such cooling. For example, U.S. Pat. No. 4,833,831 shows a gas turbine augmentator having a film cooled liner provided with fan bypass air. Other patents showing similar systems include U.S. Pat. Nos. 4,813,229, 4,800,718, 4,544,098, 4,817,378, 4,081,137 and 4,203,286. All of the foregoing prior art patents show various arrangements for providing cooling air to the exhaust nozzle, but none utilizes the total engine air flow. Each of these systems uses fan bypass air to which a considerable amount of heat has been added as the air passes through the engine.

SUMMARY OF THE INVENTION

This invention comprises an arrangement for cooling the exhaust nozzle of a gas turbine engine. Unlike any known prior art systems, this invention selectively diverts the total engine air flow to the exhaust nozzle prior to the introduction of any air to the fan or the core engine. After the cooling air impinges on the back surface of the exhaust nozzle to rapidly cool the nozzle, the air is redirected back to the fan and the core engine for supporting combustion and to provide cooling in a generally conventional manner.

Thus, in accordance with this arrangement a large quantity of unheated ambient air is supplied directly to the exhaust nozzle to cool it very quickly. After cooling the nozzle, the air flow is reversed and the air is returned to the input of the fan. Most of the fan air is then used for combustion, while a portion is conventionally bypassed and used for film cooling of the exhaust nozzle.

Some of the advantages of this invention are that it permits the use of lower temperature, lighter weight materials. It eliminates or reduces the need for multiholes film hole drilling. It maximizes the use of engine air to obtain lower temperature cooling without the need for precooling processes. It utilizes two cooling sources, i.e., normal bypass air and total engine nacelle air inflow. It isolates and insulates the engine from the aircraft fuselage.

OBJECTS OF THE INVENTION

It is the primary object of this invention to provide a cooling system for the exhaust nozzle of a gas turbine engine to very rapidly reduce the nozzle temperature.

It is another object of this invention to cool the exhaust nozzle of a gas turbine engine by using total engine air flow for nozzle cooling, such air flow then being reversed and redirected to the core engine.

It is still another object of the invention to provide a flow path of total engine air flow directly to the nozzle through an outer annular space surrounding the engine, and returning such air to the engine through an inner annular space.

Still another object of this invention is to selectively divert all engine air flow entering the engine nacelle away from the core engine and to conduct such air directly to the exhaust nozzle to provide very rapid cooling for the nozzle.

Another object of this invention is to use total engine air to impingement cool the backside of the exhaust nozzle walls, and to use fan bypass air to film cool the gas flow side of the nozzle walls.

BRIEF DESCRIPTION OF THE DRAWINGS

For further objects and advantages, and for a better understanding of this invention reference should now be made to the following detailed specification and to the accompanying drawings in which.

DESCRIPTION OF A PREFERRED EMBODIMENT OF THE INVENTION

Figure 3:
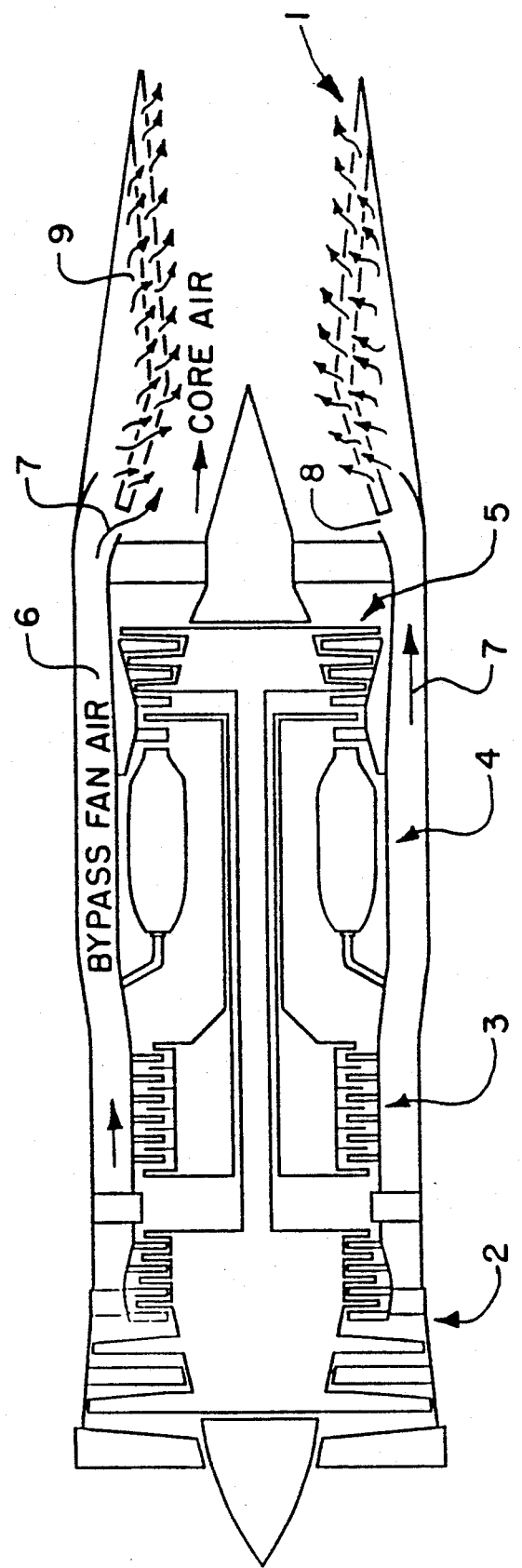
FIG. 3 is a schematic diagram showing the air flow within a conventional prior art gas turbine engine.

Referring first to the prior art illustration in FIG. 3, there is shown a typical layout for the cooling of the nozzle 1 of a conventional gas turbine engine which comprises a fan 2, a compressor 3, a combustor 4 and a turbine 5. The configuration shown in FIG. 3 is capable of operation in a single mode having two paths for the flow of air through the engine: (1) the core air, which is the air leaving the engine combustion chamber, and (2) the fan bypass air which bypasses the engine core and is directed through an annular channel 6 to the exhaust nozzle. As shown, the bypass air 7 exits into the nozzle area through passageway 8 and holes 9 to cool the interior of the double walled nozzle 1, and also to provide film cooling.

Figure 1:
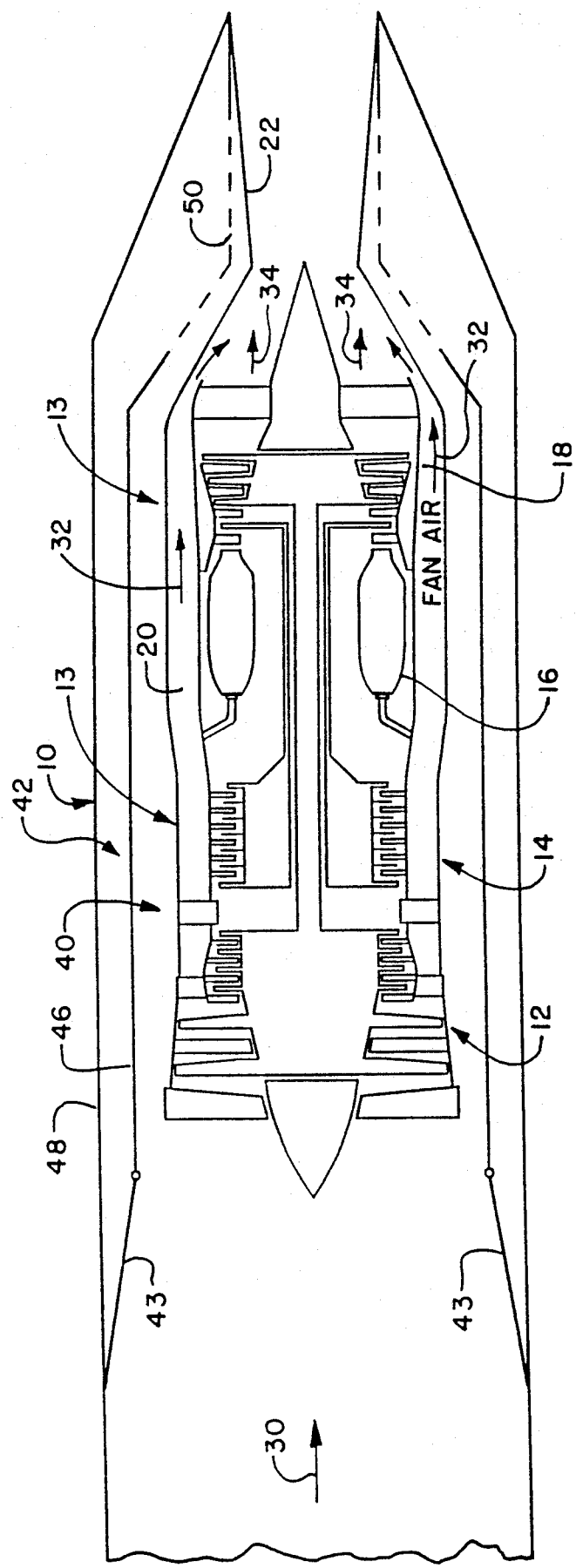
FIG. 1 is a schematic representation of a gas turbine engine made in accordance with this invention, such engine being shown in its normal nozzle cooling mode.
Figure 2:
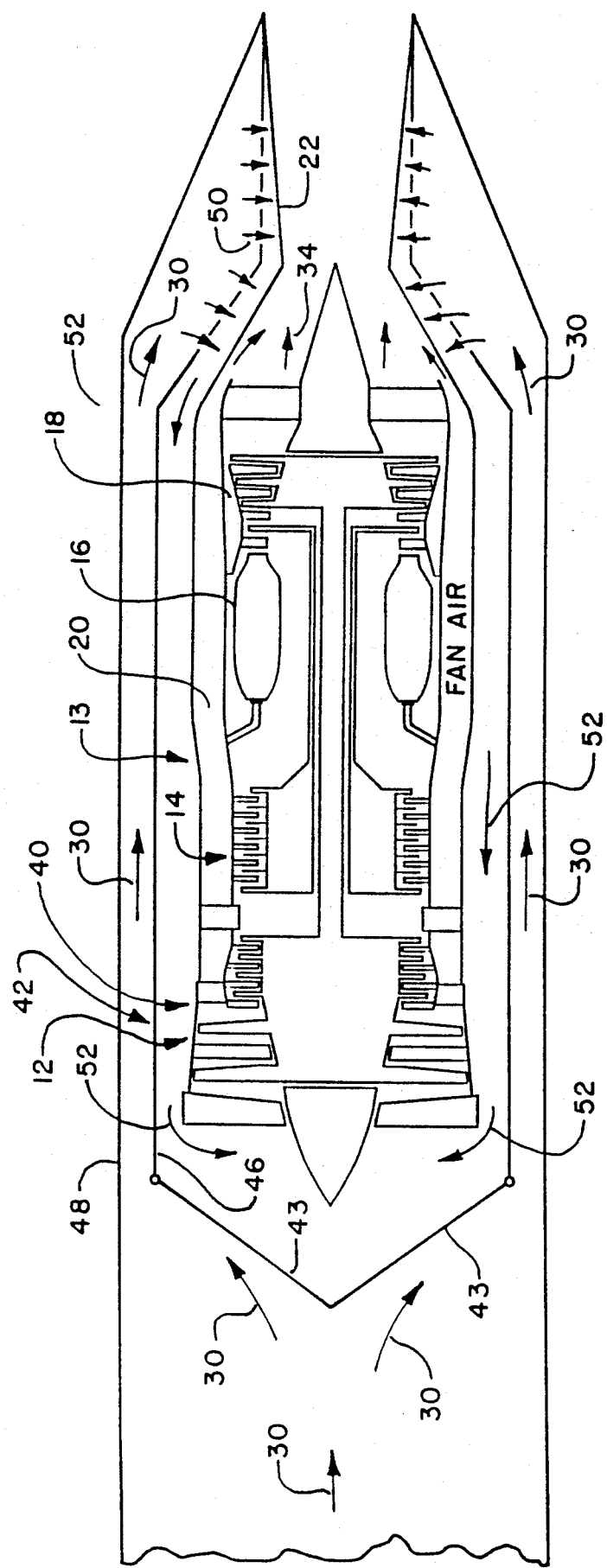
FIG. 2 is a schematic representation of a gas turbine engine made in accordance with this invention, such engine being shown in its total engine flow nozzle cooling mode.

In accordance with the present invention as illustrated in FIGS. 1 and 2, the system can be operated selectively in either of two modes. In the first mode, the flow path for the cooling air is conventional and nozzle cooling is accomplished substantially as shown in FIG. 3. In the second mode, two paths in addition to the paths shown in the prior art teachings of FIG. 3 are provided for the flow of air in order to provide enhanced and more rapid cooling for the engine nozzle.

FIGS. 1 and 2 represent a unique cooling flow management concept for a gas turbine application by using the entire engine air flow for backside impingement cooling and the entire bypass air for film cooling of the hot gas flow side of the exhaust nozzle. FIGS. 1 and 2 are identical, except that in FIG. 1, the invention is illustrated in its first operating mode with its air flow diverters in the open position, so that the input air is not diverted from the fan, while in FIG. 2 the engine is shown in its second mode of operation with air diverters in the closed position diverting the total engine air from the fan and to the exhaust nozzle.

The turbofan engine 10 illustrated in FIGS. 1 and 2 comprises a fan 12 at its upstream end, a core engine 13 which includes a compressor 14, a combustor 16 and turbine 18 disposed in flow communication with the fan 12. A fan bypass channel 20 is provided around the core engine 13. The gases exiting the core engine 13 pass through an exhaust nozzle 22.

Total engine airflow represented by all the air 30 entering engine nacelle passes through the fan 12 and is suitably channeled through the engine 10. In a typical installation about 30 percent of the fan air 30 is channeled through the bypass channel 20 as fan bypass air 32, and about 70 percent is channeled through the core engine 13 where it is mixed with fuel to generate core gases 34.

As thus far described, the construction of the engine and the flow paths through it are conventional and cooling of the nozzle 22 is accomplished by the film of fan bypass and core air flowing over it. In accordance with the present invention, the conventional engine is provided with two additional air channels 40 and 42 which surround the channel 20, and an air flow diverting gate comprised of clam shells 43 which serve to divert the flow of air from the fan 12 and the core engine 13.

The channels 40 and 42 are defined by spaced, concentric annular casings 46 and 48 which are spaced from and surround the core engine 13. The casing 48 may be a separate element, or it may be part of the aircraft structure in which the engine is installed. As shown in the drawings, the casings 46, 48 and the nozzle 22 are joined together at the nozzle end of the engine. Adjacent the nozzle 22, the casing 46 is provided with a plurality of holes 50 through which the total engine air may flow and impinge on the backside of the nozzle 22.

With the clam shells 43 in the open position shown in FIG. 1, the total engine air flow is directed through the fan 12 and as previously noted, approximately 70 percent of the air flows into the core engine 13 where the air is mixed with fuel and combustion takes place. The remainder of the air is directed through the channel 20 to the exhaust nozzle 22 to film cool the hot exposed surfaces of the nozzle 22. In the open position of the clam shells 43 (as shown in FIG. 1), the operation of the cooling system for the exhaust nozzle is conventional.

There are circumstances when it is necessary or desirable to reduce very rapidly the temperature of the exhaust nozzle, and to do this, the clam shells 43 are moved from the open position shown in FIG. 1 to the closed position shown in FIG. 2. In the FIG. 2 position, the air inlet to the fan 12 and the core engine 13 is closed and the total engine air flow 30 is diverted from the fan and is directed through the channel 42 towards the exhaust nozzle 22. When the air reaches the end of channel 42, it passes through the holes 50 and impinges on the rear wall of the nozzle 22. After impinging on the rear surface of the nozzle wall, the air direction air flow is reversed and it flows through the channel 40 in the direction of the arrows 52 and then to the input of the fan 12. Once the air enters the fan, it follows its normal route and supplies air to the combustor, and air to the channel 20 so that normal film cooling is provided.

Because total engine air flow is used to cool the nozzle, the nozzle may be simplified in construction, and for that reason, the nozzle illustrated in FIG. 1 and 2 is not made of a double wall construction, and the need for complicated fabrication is avoided. However, if desired for particular applications, a nozzle of the type shown in FIG. 3 may be used. In addition, while this invention has been disclosed in conjunction with a conventional gas turbine engine, it is apparent that it may also be used on an engine utilizing augmentation or afterburing, and it may find utility in a turboprop engine as well.

It is apparent that the invention may be subject to many modifications and adaptations, all within the scope and spirit of the invention, and it is intended, therefore, that this invention be limited only by the following claims as interpreted in the light of the prior art.

What is claimed is:

1. A gas turbine engine arrangement comprising:
    an ambient air inlet for admitting ambient air, a core engine including a bypass fan, said core engine having an air inlet and an outlet for the combustion gases of said engine, and an exhaust nozzle for the outflow of said combustion gases;
    a flow path for said ambient air from said air inlet to said nozzle for directly supplying essentially unheated ambient air to said nozzle for cooling said nozzle; and
    a reverse flow path from said nozzle to the inlet of said core engine to provide air for said core engine for supporting combustion therein, said flow path to said nozzle and said reverse flow path comprising first and second spaced concentric casings surrounding and spaced from said core engine, said casings extending from the inlet of said core engine to said exhaust nozzle, the space between said first and second casings providing said flow path to said nozzle, the space between said second casing and said core engine providing the reverse flow path from said nozzle to the air inlet to said core engine.

2. The invention as defined in claim 1 wherein said gas turbine engine is provided with a fan at the inlet to said core engine, the space between said core engine and said second casing providing a flow path for bypass air from said fan to said nozzle.

3. In a gas turbine engine system comprising a core engine having an air inlet, a compressor, a combustor, a turbine and an exhaust nozzle for the hot exhaust gases of said core engine, the combination comprising:
    an air conduit extending from said air inlet to a rear surface of said nozzle and back to said air inlet; and
    a two position air diverter in said inlet, said diverter in one of the two positions conducting the inlet air directly to said core engine, said diverter in the other of said positions blocking the direct flow of inlet air into said core engine and directing said inlet air through said air conduit to said nozzle and back to said inlet to said core engine, whereby said inlet air cools said nozzle prior to entering said core engine.

4. The invention as defined in claim 3, wherein said core engine includes a fan in the air inlet, and a fan bypass channel for the flow of bypass air from said fan to said nozzle to film cool the surface thereof.

5. The invention as defined in claim 3 wherein said air conduit comprises first and second spaced angular casings joined to said nozzle at the rear thereof, the inner of said casings being provided with a plurality of holes adjacent the back surface of said nozzle to permit the flow of air onto said nozzle for cooling said nozzle.

6. The invention as defined in claim 5, wherein said diverter comprises a first and second clam shells movable from one position blocking the flow path of the inlet air to said core engine to a second position blocking said flow path through said air conduit.

7. The invention as defined in claim 6 wherein said diverter is a clam shell having two gates pivoted to said second casing and being movable to block either the flow of air into said engine air inlet or the flow of air into said conduit.

8. An improved gas turbine engine comprising:
a total air flow inlet;
a core engine normally receiving said total air flow through said inlet, said core engine having a fan in its air input and a fan air bypass;
an exhaust nozzle, said exhaust nozzle receiving the core engine gas flow and the fan bypass air flow;
means for diverting said total air inlet flow, said means comprising a diverter positioned downstream of said air inlet and upstream from said core engine; and
a total airflow channel, said total air flow channel being connected to said air diverter, such total air flow channel conducting the total air flow to impinge against a backside of said nozzle and then back to said air input of said core engine to provide core air flow and fan bypass air flow.

* * * * *